United States Patent
Griffin et al.

(10) Patent No.: US 11,995,485 B2
(45) Date of Patent: May 28, 2024

(54) AUTOMATICALLY SWITCHING BETWEEN QUANTUM SERVICES AND CLASSICAL SERVICES BASED ON DETECTED EVENTS

(71) Applicant: RED HAT, INC., Raleigh, NC (US)

(72) Inventors: Leigh Griffin, Waterford (IE); Stephen Coady, Waterford (IE)

(73) Assignee: RED HAT, INC., Raleigh, NC (US)

( * ) Notice: Subject to any disclaimer, the term of this patent is extended or adjusted under 35 U.S.C. 154(b) by 64 days.

(21) Appl. No.: 17/742,529

(22) Filed: May 12, 2022

(65) Prior Publication Data
US 2023/0367657 A1    Nov. 16, 2023

(51) Int. Cl.
*G06F 9/54* (2006.01)
*G06N 10/80* (2022.01)

(52) U.S. Cl.
CPC .............. *G06F 9/542* (2013.01); *G06N 10/80* (2022.01)

(58) Field of Classification Search
CPC ..... G06F 9/542; G06F 16/1734; H04L 41/06; H04L 41/0604
See application file for complete search history.

(56) References Cited

U.S. PATENT DOCUMENTS

| | | | | |
|---|---|---|---|---|
| 7,376,547 B2 * | 5/2008 | Meredith | ............... | G06N 10/00 703/2 |
| 11,086,665 B2 | 8/2021 | Griffin et al. | | |
| 11,144,334 B2 | 10/2021 | Griffin et al. | | |
| 11,245,584 B2 | 2/2022 | Griffin et al. | | |
| 11,270,220 B1 * | 3/2022 | Richardson | ........... | G06F 9/5072 |
| 11,295,207 B2 * | 4/2022 | Wiebe | ................ | D02G 1/008 |
| 11,295,226 B2 | 4/2022 | Griffin et al. | | |
| 11,636,374 B2 * | 4/2023 | McMahon | ............. | G06N 10/40 706/62 |
| 2020/0117764 A1 | 4/2020 | Zuccarelli et al. | | |
| 2020/0125985 A1 | 4/2020 | Narang et al. | | |
| 2022/0180239 A1 * | 6/2022 | Shiba | ................ | G06N 10/20 |
| 2023/0143072 A1 * | 5/2023 | Flöther | ................ | G06N 10/60 706/12 |

OTHER PUBLICATIONS

Preskill, John, "Quantum Computing in the NISQ era and beyond," Institute for Quantum Information and Matter and Walter Burke Institute for Theoretical Physics, California Institute of Technology, Pasadena, CA, 91125, Jul. 30, 2018, pp. 1-20.

* cited by examiner

*Primary Examiner* — Andy Ho
(74) *Attorney, Agent, or Firm* — Kilpatrick Townsend & Stockton LLP

(57) ABSTRACT

One example described herein include a system that can detect an event associated with executing a software operation using a quantum service of a quantum computing system. Based on detecting the event, the system can identify a classical service (of a classical computing system) that corresponds to the quantum service. The system can then cause the software operation to be executed using the classical service.

20 Claims, 9 Drawing Sheets

AUTOMATICALLY SWITCHING BETWEEN QUANTUM SERVICES AND CLASSICAL SERVICES BASED ON DETECTED EVENTS

TECHNICAL FIELD

The present disclosure relates generally to quantum computing. More specifically, but not by way of limitation, this disclosure relates to automatically switching between quantum services of a quantum computing system and classical services of a classical computing system based on detected events.

BACKGROUND

Quantum computing subsystems harness quantum mechanics to provide significant advances in computation to solve problems. The main building block of a quantum computing subsystem is a quantum bit (or "qubit"). Qubits serve as the basic unit of information in quantum computing subsystems, much like how binary bits serve as the basic unit of information in classical computing systems.

A single qubit can have two or more discrete energy states, which are often referred to as basis states. The state of a qubit at a given instant in time can be any superposition of two basis states, which means that a quantum bit can be in the two basis states at the same time. This is fundamentally different from how a conventional binary bit operates on a classical computing system, whereby the bit can only be in a single state (a 0 state or a 1 state) at a given instant in time.

Qubits are often used by quantum services to perform quantum computations. To complete a quantum computation using a qubit, the state of the qubit is typically measured (e.g., read out). Due to certain physical phenomena, the quantum nature of a qubit may be temporarily lost during the measurement process, causing the superposition of the two basis states to collapse into either one basis state or the other.

DETAILED DESCRIPTION

Figure 1:
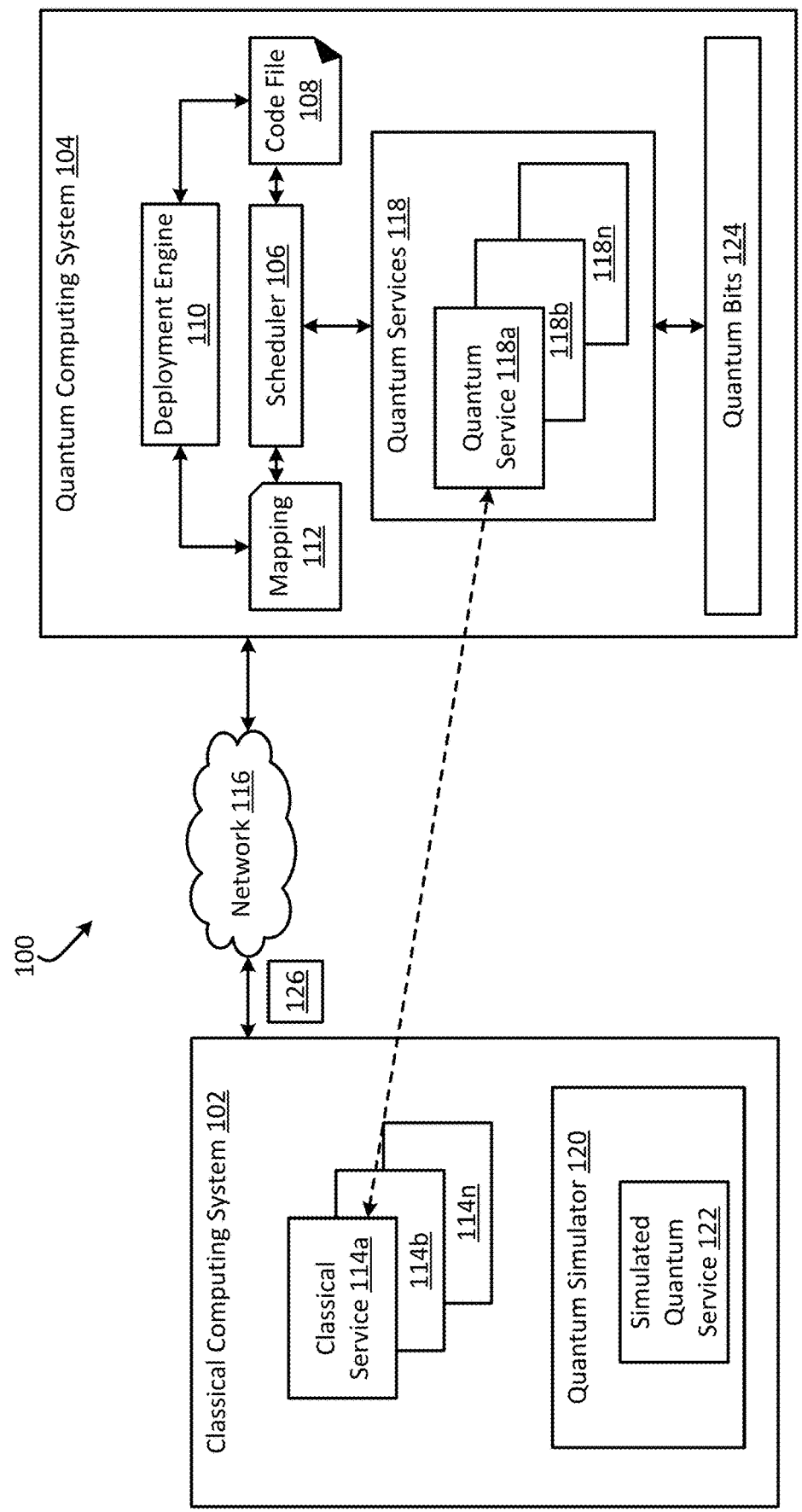
FIG. 1 is a block diagram of an example of a system for automatically switching between quantum services and classical services according to some aspects of the present disclosure.

Much research and development has recently occurred in the quantum computing sector, though the sector is still in its relative infancy. At present, many quantum computing systems lack failover mechanisms and have general problems with their reliability due to differences in how quantum computing systems function as compared to classical computing systems (computer systems that lack quantum computing capabilities). For example, quantum computing systems may have problems with noise, heat, and resource consumption that may make executing computing operations thereon at a given point in time infeasible, suboptimal, or unreliable. This may be a significant problem if the computing operations are of a high priority in which delays, errors, and failures may be unacceptable.

Some examples of the present disclosure can overcome one or more of the abovementioned problems by automatically switching from using a quantum service to perform a computing operation to using a classical service to perform the computing operation in response to detecting an event. One example of such an event can be an anomalous event indicating that the quantum service may be unsuitable for implementing the computing operation at a given point in time. As a result of this switch, the computing operation may be executed using a classical computing system in situations where the quantum computing system may have become unreliable.

In one particular example, a quantum computing system can receive a code file, where the code file includes code blocks defining a software program to be executed on the quantum computing system. An example of the code file can be a quantum assembly (QASM) file that defines the software program using any suitable quantum programming language. The software program can be a quantum algorithm. The quantum computing system can parse the QASM to identify one or more quantum services associated with various computing operations of the software program. A quantum service is a software service that relies on a qubit or quantum mechanics in performing a quantum computation. Having identified the appropriate quantum services, the quantum computing system may begin the process of scheduling the computing operations to be executed by their corresponding quantum services.

In some examples, before the quantum computing system is able to actually execute a computing operation using its corresponding quantum service, an event may occur that indicates that the quantum service has become unsuitable for implementing that computing operation. The quantum computing system can detect such an event and, in response, automatically execute a switching routine designed to resolve this issue.

For example, the quantum computing system can begin by identifying a classical service that corresponds to the quantum service. A classical service is a software service that does not rely on qubits or quantum mechanics in performing computations. In some examples, the quantum computing system can determine which classical service corresponds to the quantum service by using a predefined mapping of quantum services to classical services. A classical service may be considered to "correspond" to a quantum service if the classical service has functionality that is similar in type or purpose to the quantum service. For example, a classical service for implementing graph databases, such as GraphDB, may be considered to correspond to a quantum service for implementing graph databases, such as Quantum Graphs. As another example, a classical service for training neural networks may be considered to correspond to a quantum service for training neural networks.

Having identified a classical service that corresponds to the quantum service, the quantum computing system can then cause the computing operation to be executed using the classical service rather than the quantum service. In some examples, the quantum computing system can cause the classical service to execute the computing operation by transmitting one or more commands to the classical computing system. By using the classical service to execute the computing operation, it can avoid problems that may have arose had the unsuitable quantum service been used.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for automatically switching between quantum services and classical services according to some aspects of the present disclosure. The system 100 includes a quantum computing system 104. The quantum computing system 104 can include any number of qubits 124 for use in performing quantum computations. The quantum computing system 104 can also include quantum services 118, such as database services, machine-learning services, and analytical services. The quantum services 118 may rely on the qubits 124 in performing one or more quantum computations.

A user may wish to execute a software program on the quantum computing system 104. In some cases, the user may define the software program in a code file 108. The code file 108 may be a QASM file that defines the software program using any suitable quantum programming language. The user may draft the QASM file using a software development kit (SDK) designed for creating such files. One example of such an SDK can be Qiskit, which is an open-source SDK for creating QASM files and working with quantum computers.

Figure 2:
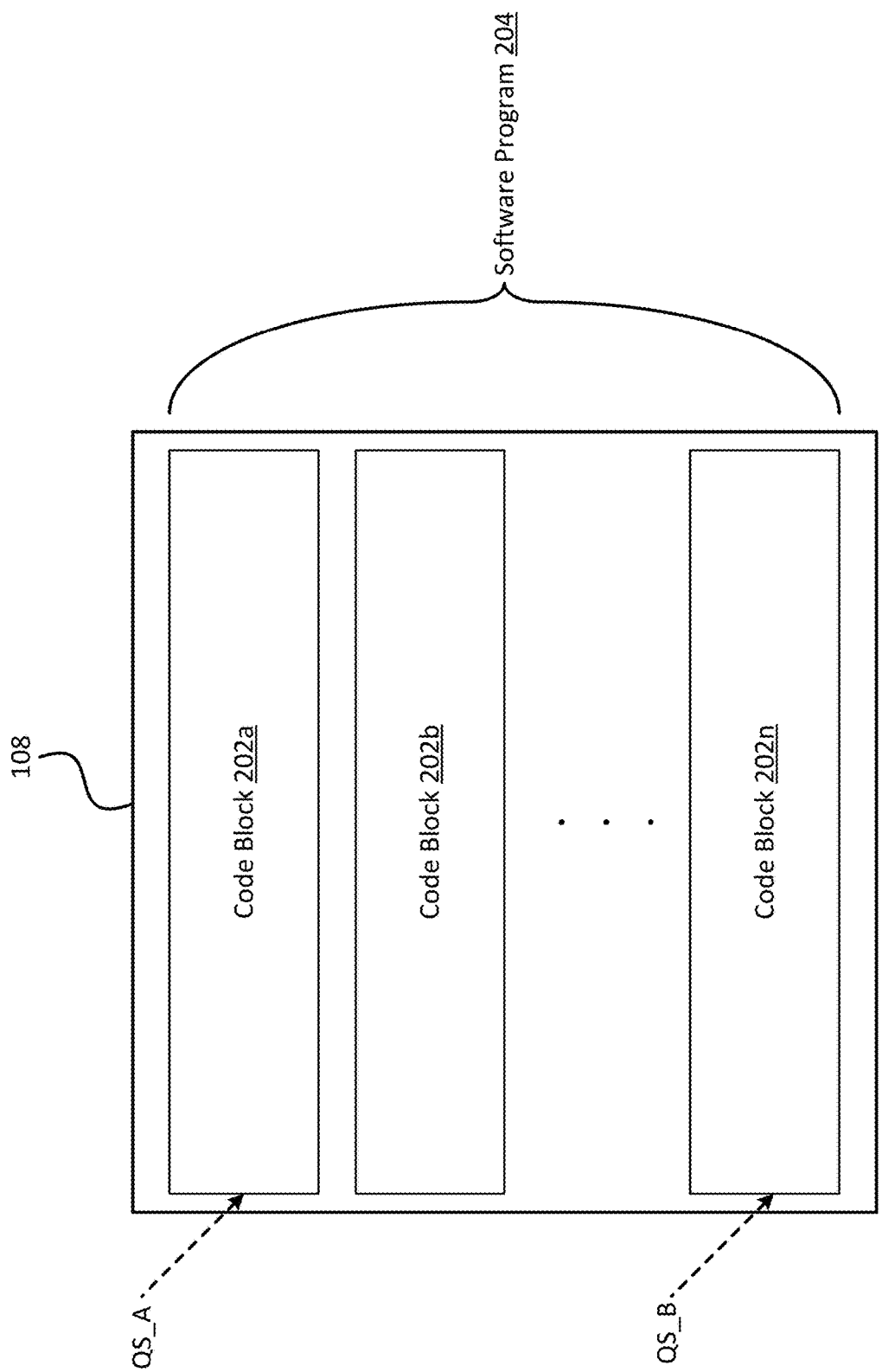
FIG. 2 is a block diagram of an example of code file according to some aspects of the present disclosure.

The code file 108 can include code blocks, where each code block may include a respective set of quantum instructions for implementing one or more computing operations. Some of the computing operations may involve the quantum services 118. For example, the code file 108 may include a first code block that leverages a quantum service 118a to perform a computing operation, such as a database operation. The code file 108 may also include a second code block that leverages another quantum service 118n to perform another computing operation, such as a mathematical computation. The code file 108 can include any number of code blocks, that leverage any number and combination of the quantum services 118, to perform a set of computing operations associated with the software program. One example of the code file 108 is shown in FIG. 2. As shown, the code file 108 can include multiple code blocks 202a-n that collectively define a software program 204. Some or all of the code blocks 202a-n may be associated with corresponding quantum services. In this example, code block 202a is associated with quantum service A (QS_A). For example, code block 202a may rely on the quantum service A for executing a particular computing operation. Code block 202n is associated with quantum service B (QS_B). For example, code block 202n may rely on the quantum service B for executing another computing operation.

Continuing with FIG. 1, during the course of operation, the quantum computing system 104 may become unreliable for various reasons. To help prevent or mitigate problems that may arise from this unreliability, the quantum computing system 104 can also include a deployment engine 110 and a modified scheduler 106 that can operate as follows.

The deployment engine 110 can access the code file 108, for example by opening it, to retrieve the content therein. The deployment engine 110 can parse through the code blocks in the code file to determine one or more quantum services 118 associated with each code block. This may involve analyzing each code block for application programming interface (API) calls, function names and calls, annotations and comments, ports, service names, bindings, and other data that is suggestive of a particular quantum service. Some code blocks may have more than one associated quantum service, and other code blocks may not have any associated quantum services. In the example shown in FIG. 1, the deployment engine 110 can determine that the code blocks are associated with the quantum services 118a-n.

Figure 3:
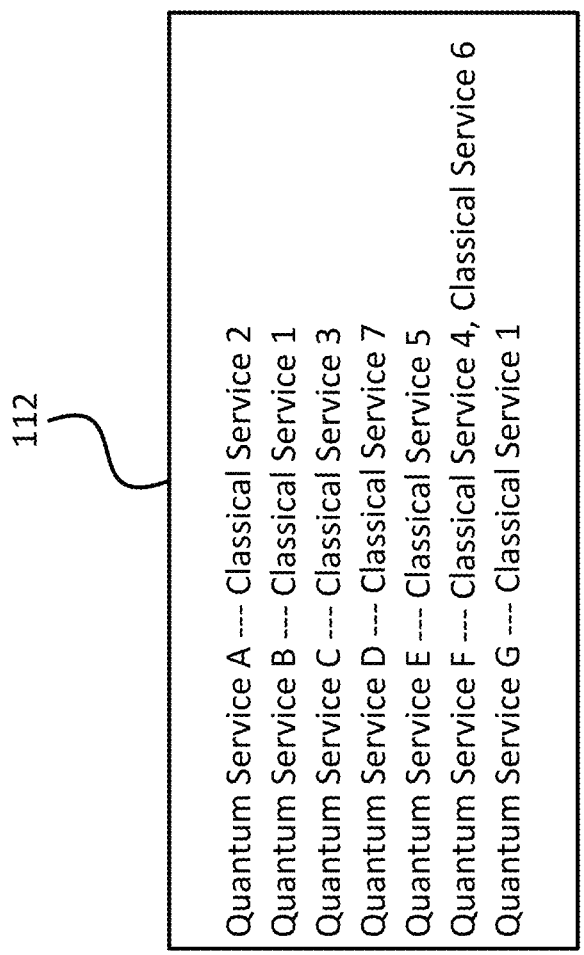
FIG. 3 is a block diagram of an example of a predefined mapping according to some aspects of the present disclosure.

For each code block that has an associated quantum service, the deployment engine 110 can determine a classical service that corresponds to the quantum service. For example, the deployment engine 110 can determine that classical service 114a corresponds to quantum service 118a. This correlation is represented by a dashed arrow in the figure. In some examples, the deployment engine 110 can make this determination by using a predefined mapping 112. The predefined mapping 112 can correlate quantum services 118a-n to classical services 114a-n. One example of such a mapping 112 is shown in FIG. 3. As shown, the mapping 112 correlates each quantum service to one or more classical services. The mapping 112 can be created by a developer who may, for example, correlate quantum services that have a particular functionality or purpose to classical services that have the same functionality or purpose.

Once the deployment engine 110 determines which classical services 114a-n correspond to the quantum services 118a-n (that are associated with the code blocks), the deployment engine 110 can next determine if those classical services 114a-n are already running on a classical computing system 102. For example, the deployment engine 110 can communicate with the classical computing system 102 via one or more networks, such as a local area network or the Internet, to determine which (if any) of the classical services 114a-n are already running thereon. For each classical service that is not already running on the classical computing system 102, the deployment engine 110 can cause that classical service to be deployed on the classical computing system 102. This may involve the deployment engine 110 transmitting one or more commands to the classical computing system 102 for causing the classical computing system 102 to deploy the classical service. In some examples, the classical computing system 102 may need to download the appropriate software before it can deploy the classical service. At the conclusion of this process, each of the quantum services 118a-n may have one or more corresponding classical services 114a-n running in the classical computing system 102. This may expedite switching operations later on, because the classical services will already be running when they are needed.

In some cases there may not be a suitable classical analog for a particular quantum service. So, a simulated quantum service may be used. For example, the deployment engine 110 can command the classical computing system 102 to deploy a quantum simulator 120 on the classical computing system 102. The quantum simulator 120 can be configured to mimic a real quantum computing system, such as quantum computing system 104. For example, the quantum simulator 120 may be designed to mimic qubit functionality and quantum mechanics. The deployment engine 110 can then command the classical computing system 102 to deploy a simulated quantum service 122 within the quantum simulator 120. For example, the deployment engine 110 can transmit one or more commands to the classical computing system 102 for causing the classical computing system 102 to deploy the simulated quantum service 122. The simulated quantum service 122 can be configured to mimic its associated quantum service (e.g., quantum service 118b) on the quantum computing system 104. The simulated quantum service 122 can then serve as the classical-service alternative to the real quantum-service.

Figure 4:
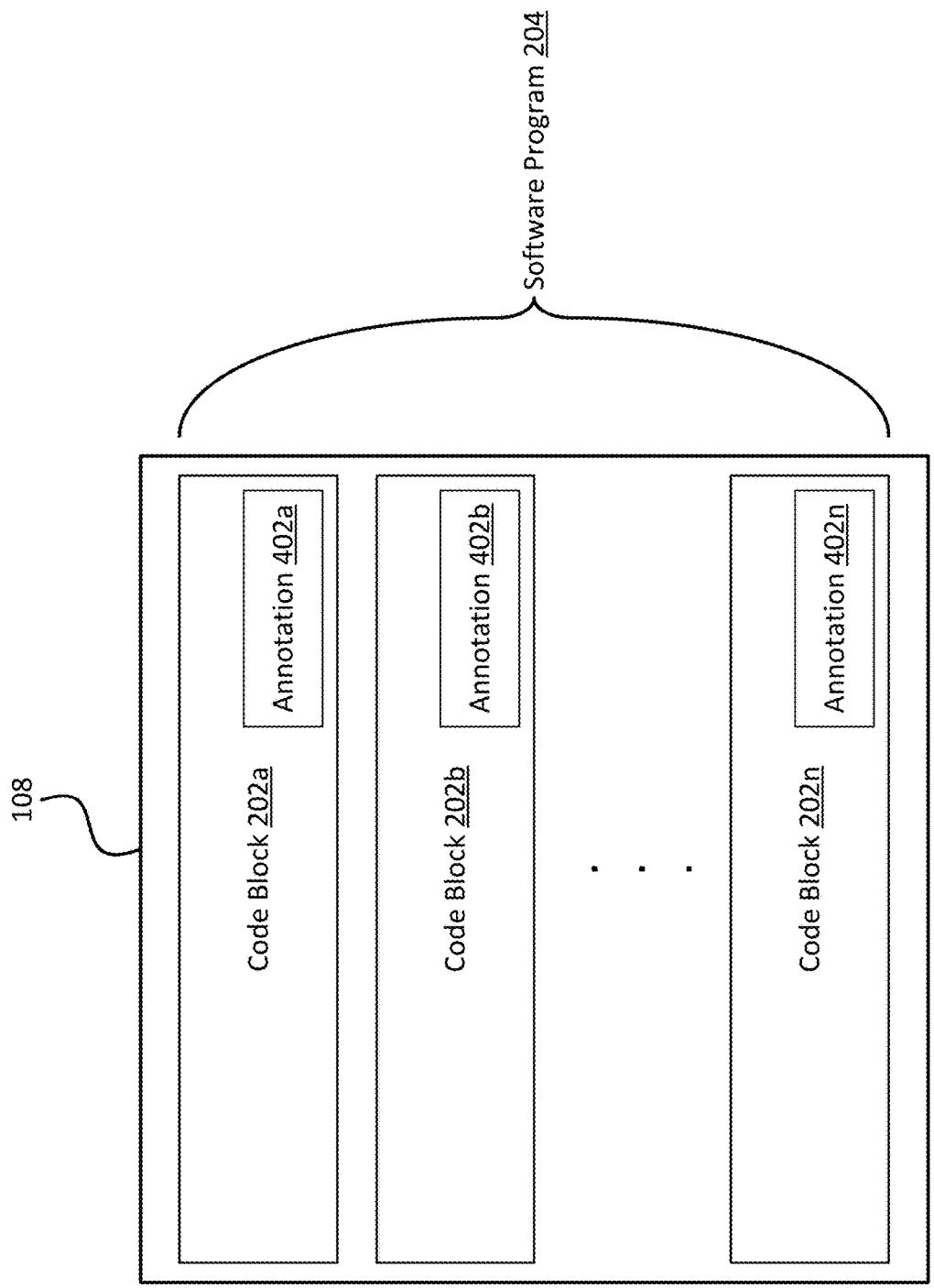
FIG. 4 is a block diagram of an example of code file with annotations according to some aspects of the present disclosure.

In some examples, the deployment engine 110 may also store data indicating the relationships between the classical services 114a-n and the code blocks of the code file 108. The data may be stored in the code file 108 or elsewhere, such as in a separate file. For example, the deployment engine 110 can incorporate annotations into the content of the code file 108, where the annotations indicate one or more classical services corresponding to each code block. The annotations may include comments, notes, additional code, etc. One example of the annotations is shown in FIG. 4. As shown, each of the code blocks 202a-n has been modified to include a corresponding annotation 402a-n indicating one or more classical services associated with that code block. For example, code block 202a can include an annotation 402a that includes a unique identifier of classical service 114a. Code block 202b can include an annotation 402b that includes a unique identifier of classical service 114b. And so on. After annotating the code file 108, the updated code file 108 may be ready for use by the scheduler 106.

The scheduler 106 is software that can receive the code file 108, parse it, and schedule the code blocks for execution on the quantum computing system 104. Execution of the code blocks may normally involve use of the quantum services 118a-n, as described above. During normal operation, the scheduler 106 may attempt to execute the entire software program on the quantum computing system 104. For example, the scheduler 106 may default to executing the computing operations defined in the code blocks using the quantum services 118a-n on the quantum computing system 104.

Over time, the quantum computing system 104 may become less reliable or otherwise less suitable for performing a particular computing operation associated with the software program. For example, an attribute of the quantum computing system 104 may exceed a predefined threshold at a given instant in time. Examples of such an attribute can include a latency attribute indicating an amount of latency that is associated with one or more computing operations, a temperature attribute indicating a temperature associated with the quantum computing system 104, or a resource usage attribute indicating an amount of computing resources (e.g., processing power, memory, or storage space) consumed by the quantum computing system 104. If the attribute exceeds the predefined threshold, it may mean that the quantum computing system 104 is not well suited at that point in time for performing one or more computing operations that would normally involve one or more quantum services 118. The scheduler 106 can detect these events as well as other events that are indicative of a current or future operational problem with the quantum computing system 104. In response to detecting such an event, the scheduler 106 can automatically execute a switching routine for causing the one or more computer operations to be executed using one or more classical services rather than the one or more quantum services.

For example, the scheduler 106 can detect an event based on one or more messages received from a source that is internal or external to the quantum computing system 104. Examples of the source can include a sensor, such as a temperature sensor or a battery charge-level sensor; a controller such as a memory controller or a disk controller; or a central processing unit. The scheduler 106 may detect the event before, during, or after processing the code file 108. In response to detecting the event, the scheduler 106 can determine a particular code block that is scheduled for execution on the quantum computing system 104. The code block may be configured to execute a computing operation using a quantum service 118a. The scheduler 106 can then determine a classical service 114a corresponding to that code block based on the stored data (e.g., an annotation in the code file 108) generated by the deployment engine 110. Having identified the relevant classical service 114a, the scheduler 106 can command the classical computing system 102 to execute the computing operation using the classical service 114a. The classical service 114a can execute the computing operation relatively quickly because it was already previously deployed by the deployment engine 110 and may have been waiting for instructions. In some examples, the scheduler 106 can also prevent the computing operation from being executed using the quantum service 118a (that was originally designated for that computing operation), for example to prevent redundant computations. If the quantum service 118a has already begun executing the computing operation, the scheduler 106 can stop the quantum service 118a so that it does not complete. Using these techniques, the scheduler 106 can automatically switch from the originally designated quantum service 118a to the corresponding classical service 114a as needed.

When executed, the classical service 114a can output a result 126. The classical computing system 102 can then transmit the result 126 to the quantum computing system 104. The result 126 may then be used in relation to one or more subsequent code blocks defined in the code file 108. For example, the result 126 may be supplied as input to another quantum service 118b or another classical service 114b associated with a subsequent code block of the code file 108. Likewise, results from prior-executed classical services and prior-executed quantum services may be provided as input to the classical service 114a for use in generating its result 126. In this manner, the results from classical services and quantum services can be seamlessly integrated together, in a relatively transparent manner to the user, to run the overall software program.

Although FIG. 1 depicts a certain number and arrangement of components, this is for illustrative purposes and intended to be non-limiting. Other examples may include more components, fewer components, different components, or a different arrangement of components than is shown in FIG. 1. For instance, in other examples the deployment engine 110 may be unnecessary and excluded altogether. For example, the scheduler 106 may detect any of the events described above. In response to detecting the event, the scheduler 106 can analyze the code file 108 to determine a quantum service 118a associated with a computing operation in the code file 108. The scheduler 106 can make this determination using any of the techniques described above with respect to the deployment engine 110. The scheduler 106 can then use the mapping 112 to determine a classical service 114a corresponding to the quantum service 118a. Having determined the relevant classical service 114a, the scheduler 106 can cause the classical service 114a to be deployed on the classical computing system 102, if it is not already deployed thereon. This may involve the scheduler 106 transmitting one or more commands to the classical computing system 102 for causing the classical service 114a to be deployed thereon. The scheduler 106 can then command the classical computing system 102 to execute the computing operation using the classical service 114a (e.g., rather than the quantum service 118a). Using this approach may increase the amount of latency involved in executing the computing operation, because of the inherent delay in starting up the classical service 114a. But this approach may also reduce the total amount of computing resources consumed by the classical computing system 102, because the classical service 114a may not be executed until it is actually needed. The classical service 114a may also be shut down by the classical computing system 102 once it is finished executing the computing operation to further conserve resources.

Figure 5:
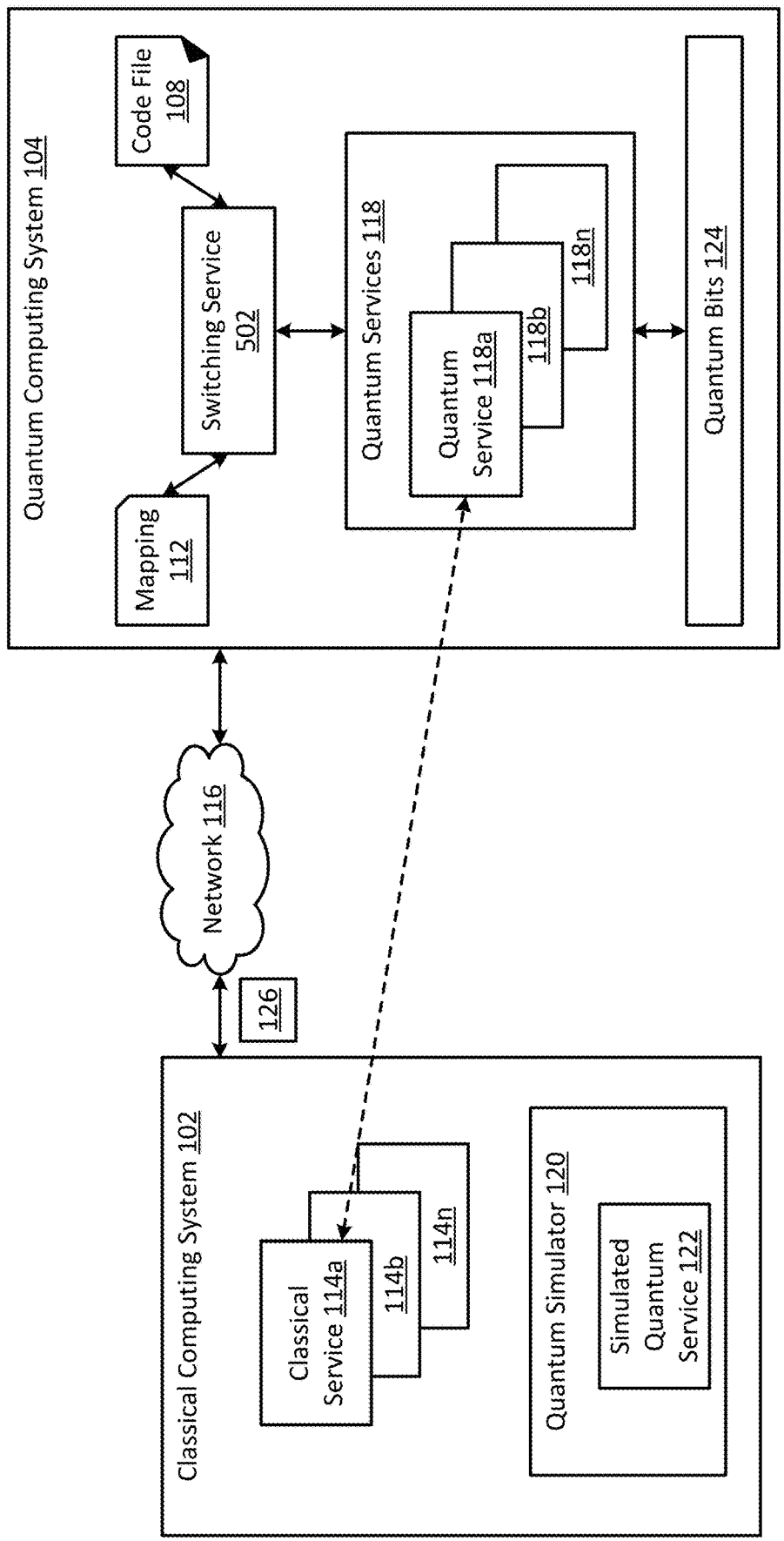
FIG. 5 is a block diagram of an example of a system with a switching service for automatically switching between quantum services and classical services according to some aspects of the present disclosure.

In some examples, the deployment engine 110 and the scheduler 106 may be combined into a single software component capable of implementing both their functionalities, rather than being separate software components. One example of this arrangement is shown in FIG. 5. As shown, the quantum computing system 104 can include a switching service 502. The switching service 502 can be configured to perform some or all of the functionality of the deployment engine 110, as well as some or all of the functionality of the scheduler 106. For example, the switching service 502 can be configured to detect an event associated with executing a software operation using a quantum service 118a of a quantum computing system 104. In response to detecting the event, the switching service 502 can determine a classical service 114a, of a classical computing system 102, corresponding to the quantum service 118a. Based on determining that the classical service 114a corresponds to the quantum service 118a, the switching service 502 can cause the software operation to be executed using the classical service 114a.

Figure 6:
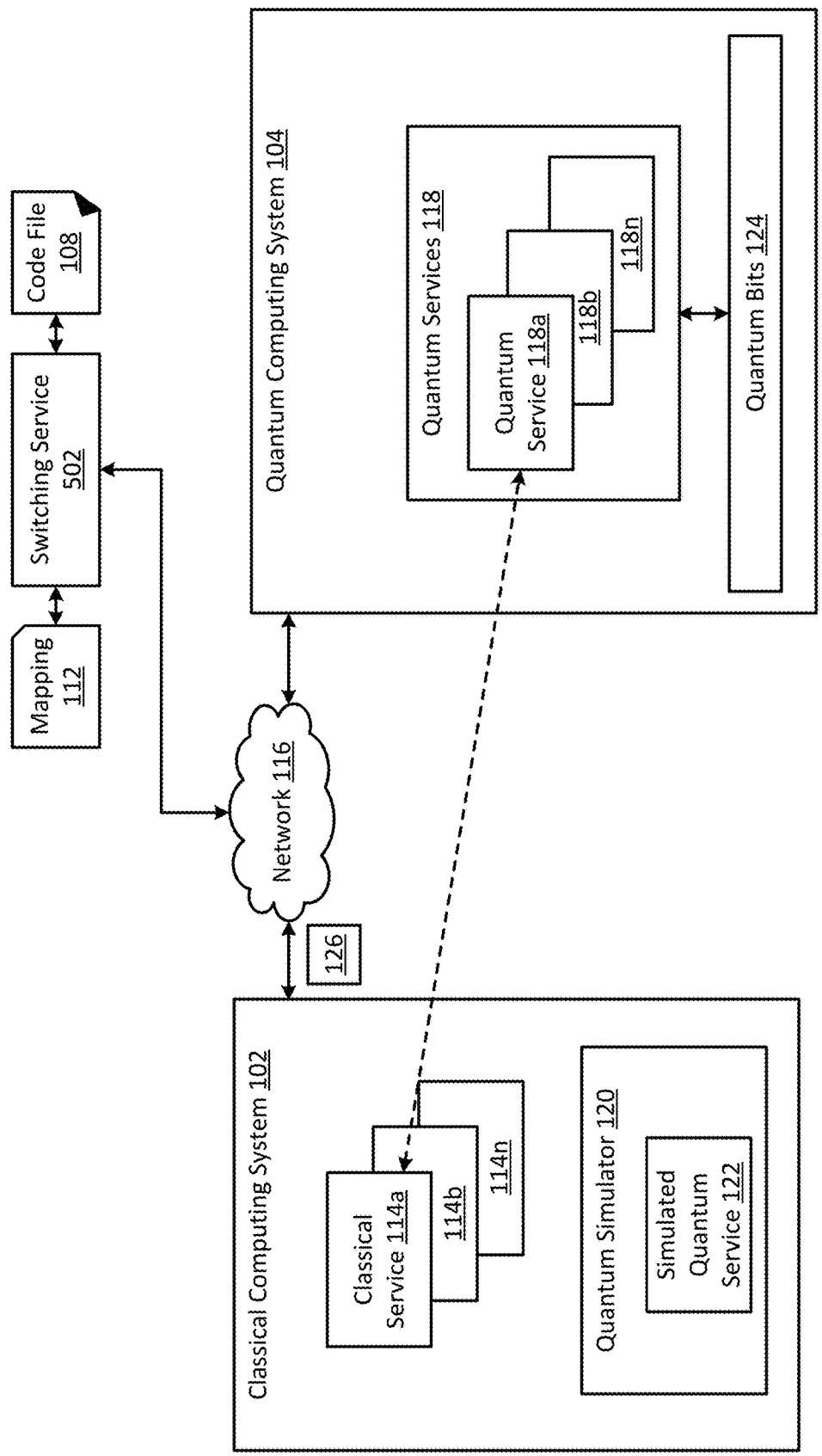
FIG. 6 is a block diagram of an example of a system with a switching service located externally to a quantum computing system according to some aspects of the present disclosure.

In some examples, the switching service 502, the scheduler 106, the deployment engine 110, the mapping 112, the code file 108, or any combination of these, may be located externally to the quantum computing system 104, such as in the classical computing system 102 or elsewhere. One example of this arrangement is shown in FIG. 6. As shown, the switching service 502 can be located outside the quantum computing system 104 and the classical computing system 102. The switching service 502 can interact with the quantum computing system 104 and the classical computing system 102 to perform any of the functionality described above. Additionally or alternatively, the mapping 112 and the code file 108 can be located outside the quantum computing system 104 and accessible to the switching service 502.

Figure 7:
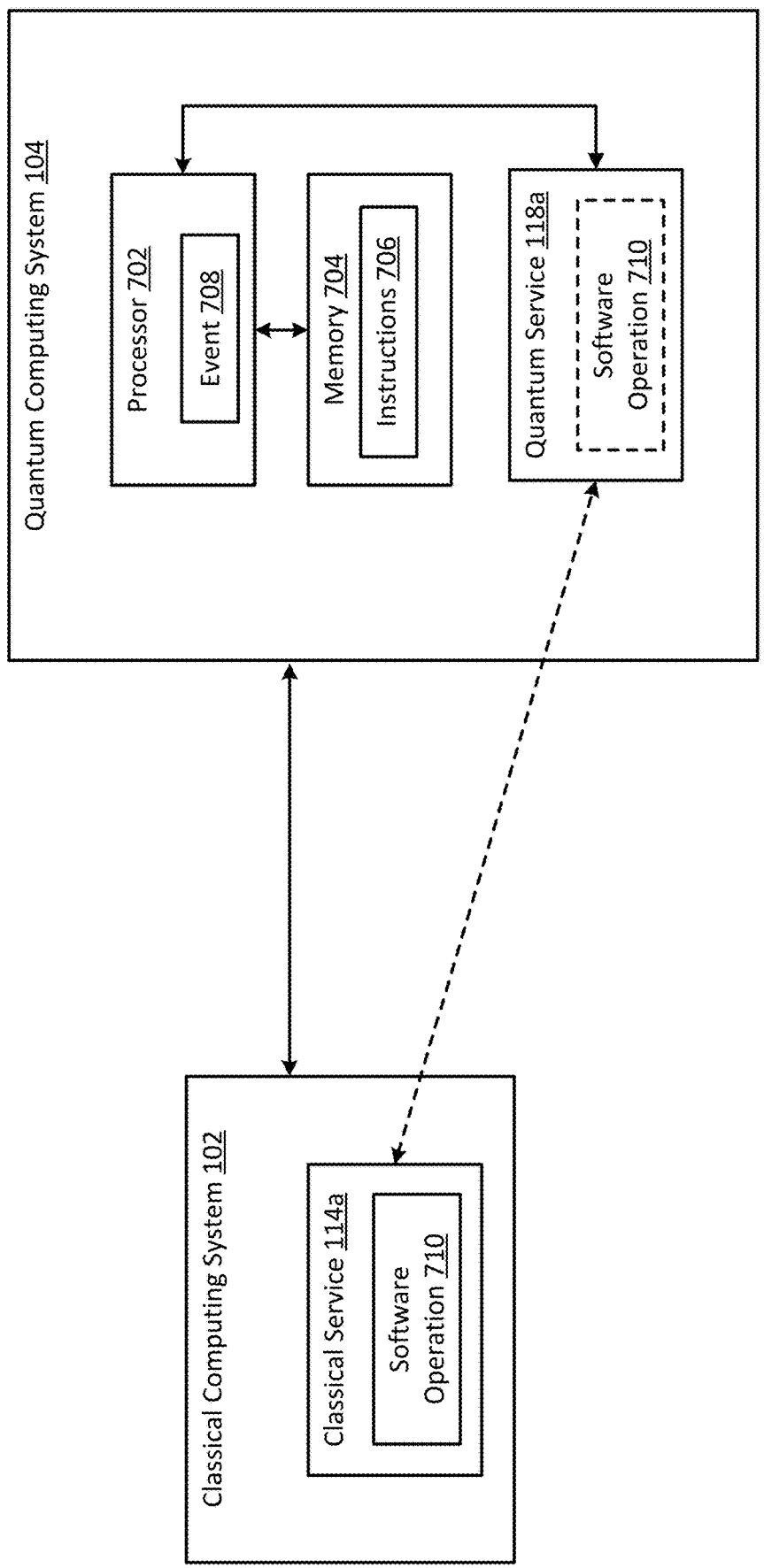
FIG. 7 is a block diagram of an example of a system for automatically switching between quantum services and classical services according to some aspects of the present disclosure.

FIG. 7 is a block diagram of an example of a system for automatically switching between quantum services and classical services according to some aspects of the present disclosure. The system includes a processor 702 communicatively coupled to a memory 704. Although the processor 702 and memory 704 are depicted as internal to the quantum computing system 104 in this example, it will be appreciated that in other examples they may be located outside of the quantum computing system 104, such as within the classical computing system 102 or elsewhere.

The processor 702 can include one processing device or multiple processing devices. Non-limiting examples of the processor 702 include a Field-Programmable Gate Array (FPGA), an application-specific integrated circuit (ASIC), a microprocessor, etc. The processor 702 can execute instructions 706 stored in the memory 704 to perform the operations. In some examples, the instructions 706 can include processor-specific instructions generated by a compiler or an interpreter from code written in any suitable computer-programming language, such as C, C++, C#, etc.

Memory 704 can include one memory device or multiple memory devices. The memory 704 can be non-volatile and may include any type of memory device that retains stored information when powered off. Non-limiting examples of the memory 704 include electrically erasable and programmable read-only memory (EEPROM), flash memory, or any other type of non-volatile memory. At least some of the memory 704 can include a non-transitory computer-readable medium from which the processor 702 can read instructions 706. A computer-readable medium can include electronic, optical, magnetic, or other storage devices capable of providing the processor 702 with computer-readable instructions 706 or other program code. Examples of a computer-readable medium can include magnetic disks, memory chips, ROM, random-access memory RAM, an ASIC, a configured processor, optical storage, or any other medium from which a computer processor can read instructions 706.

In some examples, the processor 702 can execute the instructions 706 to perform operations. For example, the processor 702 can detect an event 508 associated with executing a software operation 510 using a quantum service 118a of a quantum computing system 104. Based on detecting the event 508, the processor 702 can determine a classical service 114a, of a classical computing system 102, corresponding to the quantum service 118a. This correlation is represented in FIG. 7 by a dashed arrow. Based on determining that the classical service 114a corresponds to the quantum service 118a, the processor 702 can cause the software operation 710 to be executed using the classical service 114a. This may involve the processor 702 transmitting commands to the classical computing system 102, where the commands are configured to initiate execution of the software operation 710 using the classical service 114a.

Figure 8:
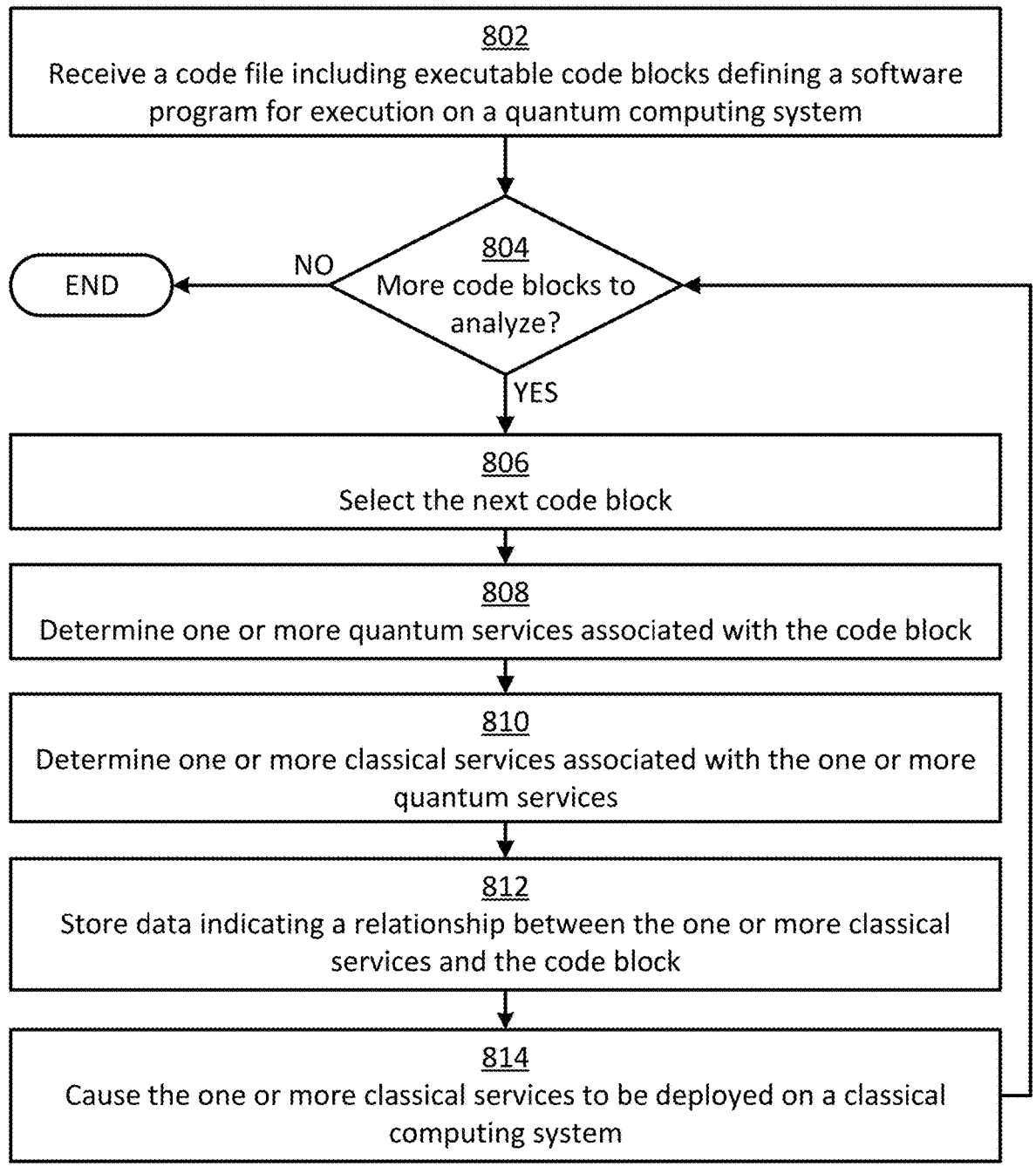
FIG. 8 is a flow chart of an example of a process for determining relationships between classical services and code blocks according to some aspects of the present disclosure.

In some examples, the processor 702 can implemented the process shown in FIG. 8. This process can be considered to be a type of pre-optimization routine, designed to expedite execution of computing operations later on using the classical services. Of course, the process shown in FIG. 8 is intended to be illustrative and non-limiting. Other examples may include more operations, fewer operations, different operations, or a different order of operations than is shown in FIG. 8. The process will now described below with reference to the components of FIGS. 1-7 above.

In block 802, the processor 702 receives a code file 108 including code blocks 202a-n defining a software program 204 for execution on a quantum computing system 104. The code file 108 may be drafted by a human developer, in some examples.

In block 804, the processor 702 determines if there are any more code blocks in the code file 108 to analyze. If there are no more code blocks to be analyzed, for example because the analysis procedure has reached the end of the code file 108, the process can end. Otherwise, the process can proceed to block 806.

At block 806, the processor 702 selects the next code block in the code file 108 for analysis.

At block 808, the processor 702 determines one or more quantum services 118 associated with the code block 202a. This may involve analyzing the code block 202a for API names or calls, function names and calls, annotations and comments, ports, service names, bindings, and other data that is suggestive of the quantum services 118. In some examples, there may be multiple quantum services associated with a single code block 202a. The processor 702 can identify all such quantum services, for example using any of the techniques described above.

At block 810, the processor 702 determines one or more classical services (e.g., classical service 114a) associated with the one or more quantum services 118. In some examples, the processor 702 can identify the one or more classical services using a predefined mapping 112 of quantum services 118a-n to classical services 114a-n.

At block 812, the processor 702 stores data indicating a relationship between the one or more classical services and the code block 202a. In some examples, the processor 702 can store the data in the code file 108. For example, the processor 702 can store one or more annotations (e.g., annotation 402a) within the code block 202a, where the one or more annotations can uniquely identify the corresponding classical services. In this way, the one or more annotations can serve as the data that indicates the relationship between the one or more classical services and the code block 202a. Alternatively, the one or more annotations may be stored elsewhere in the code file 108 and indicate said relationship.

In block 814, the processor 702 causes the one or more classical services to be deployed on a classical computing system 102. This may involve transmitting one or more commands to the classical computing system 102. The one or more commands can be configured to initiate execution of the one or more classical services on the classical computing system 102.

At the conclusion of block 814, the process may return to block 804 and repeat. Once there are no more code blocks in the code file 108 to be analyzed, the process may end.

Figure 9:
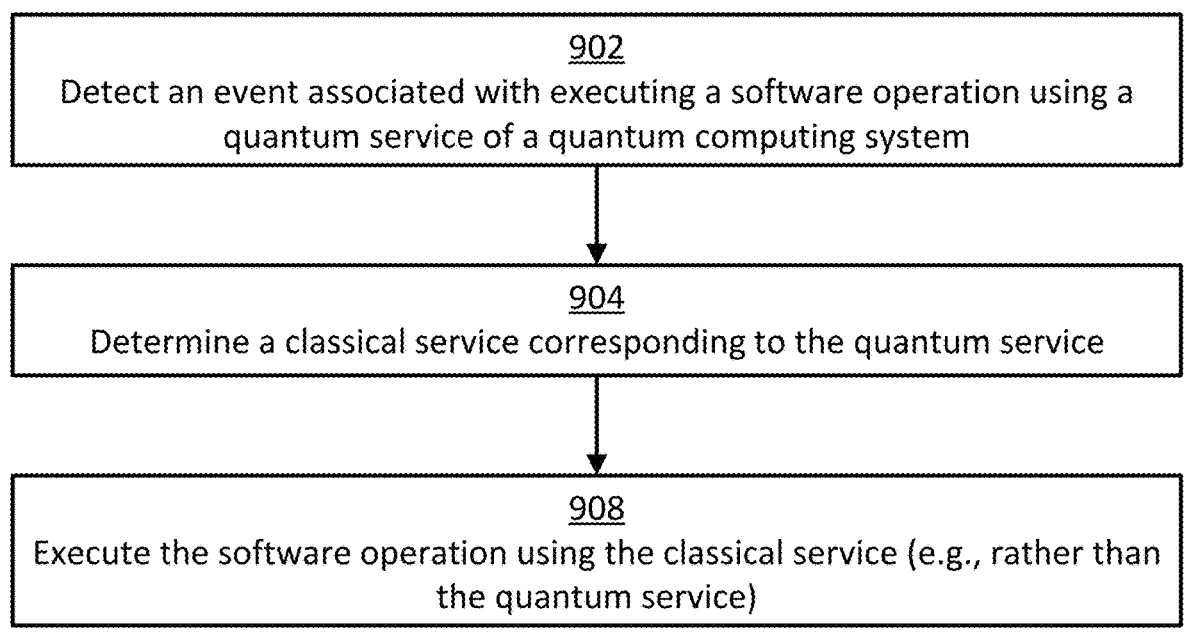
FIG. 9 is a flow chart of an example of a process for automatically switching between quantum services and classical services according to some aspects of the present disclosure.

In some examples, the processor 702 can implemented the process shown in FIG. 9. This process can be considered to be a type of switching routine for switching between quantum services and classical services. Of course, the process shown in FIG. 9 is intended to be illustrative and non-limiting. Other examples may include more operations, fewer operations, different operations, or a different order of operations than is shown in FIG. 9. The process will now described below with reference to the components of FIGS. 1-7 above.

In block 902, the processor 702 detects an event 508 associated with executing a software operation 510 using a quantum service 118a of a quantum computing system 104. In some examples, the processor 702 can detect the event based on event messages on a message bus, or based on other communications received from other software or hardware components. The event 508 may be any type of event that would negatively impact the execution of the software operation 510 on the quantum computing system 104. The event 508 may be indicative of an anomaly or another functional problem with the quantum computing system, currently or in the future. In one example, the event 508 may include an attribute of the quantum computing system 104 exceeding a predefined threshold (which may be set by a user).

In block 904, the processor 702 identifies a classical service 114a (of a classical computing system 102) that corresponds to the quantum service 118a, based on detecting the event 508. In some examples, the processor 702 can identify multiple classical services 114a-b that correspond to the quantum service 118a. The processor can identify the classical service(s) using a predefined mapping 112, in some examples.

In block 908, the processor 702 causes the software operation 710 to be executed using the classical service 114a, based on identifying the classical service 114a. This may involve the processor 702 transmitting commands to the classical computing system 102, where the commands are configured to initiate execution of the software operation 710 using the classical service 114a. In some examples in which multiple classical services 114a-b are correlated to the quantum service 118a, the processor 702 can cause the software operation 710 to be executed using the multiple classical services 114a-b.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example described herein can be combined with any other examples to yield further examples.

The invention claimed is:

1. A non-transitory computer readable medium comprising program code that is executable by a processor for causing the processor to:
    detect, after a scheduler has scheduled a software operation to be executed by a quantum service of a quantum computing system, an event associated with executing the software operation using the quantum service of the quantum computing system; and
    based on detecting the event:
        identify a classical service, of a classical computing system, that corresponds to the quantum service; and
        based on identifying the classical service, cause the software operation to be executed using the classical service.

2. The non-transitory computer readable medium of claim 1, further comprising program code that is executable by the processor for causing the processor to, prior to detecting the event:
    determine an association between the quantum service and the classical service using a predefined mapping of quantum services to classical services; and
    based on determining the association, cause the classical service to be deployed on the classical computing system.

3. The non-transitory computer readable medium of claim 2, wherein the classical service is a simulated quantum service that is executable within a quantum simulator on the classical computing system, the quantum simulator being configured to mimic the quantum computing system, and the simulated quantum service being configured to mimic the quantum service.

4. The non-transitory computer readable medium of claim 1, further comprising program code that is executable by the processor for causing the processor to, prior to detecting the event:

open a code file to retrieve content therein, wherein the content includes a plurality of code blocks defining a software program for execution using the quantum computing system;

analyze the content of the code file to determine a plurality of quantum services associated with the plurality of code blocks;

based on determining the plurality of quantum services, determine a plurality of classical services associated with the plurality of quantum services using a predefined mapping of quantum services to classical services; and based on determining the plurality of classical services, cause the plurality of classical services to be deployed on the classical computing system.

5. The non-transitory computer readable medium of claim 4, further comprising program code that is executable by the processor for causing the processor to, based on determining the plurality of classical services:

incorporate a plurality of annotations into the content of the code file, each annotation of the plurality of annotations being incorporated into the code file in relation to a respective code block of the plurality of code blocks and indicating a respective classical service associated with a respective quantum service corresponding to the respective code block.

6. The non-transitory computer readable medium of claim 5, further comprising program code that is executable by the processor for causing the processor to, in response to detecting the event:

determine that the classical service corresponds to the quantum service based on an annotation of the plurality of annotations in the code file; and based on determining that the classical service corresponds to the quantum service, select the classical service from among the plurality of classical services for use in executing the software operation.

7. The non-transitory computer readable medium of claim 1, further comprising program code that is executable by the processor for causing the processor to, in response to detecting the event:

prevent the quantum service from executing, or continuing to execute, the software operation.

8. The non-transitory computer readable medium of claim 1, further comprising program code that is executable by the processor for causing the processor to, based on detecting the event:

determine that the classical service corresponds to the quantum service based on a predefined mapping of quantum services to classical services; and based on determining that the classical service corresponds to the quantum service, select the classical service from among a plurality of classical services for use in executing the software operation.

9. The non-transitory computer readable medium of claim 1, wherein the software operation is associated with a software program, further comprising program code that is executable by the processor for causing the processor to:

receive a result of the software operation from the classical service; and provide the result to another quantum service of the quantum computing system for executing in a subsequent software operation associated with the software program.

10. The non-transitory computer readable medium of claim 9, wherein the event involves an attribute of the quantum computing system exceeding a predefined threshold.

11. The non-transitory computer readable medium of claim 10, wherein the attribute includes a latency attribute, a temperature attribute, or a resource usage attribute.

12. The non-transitory computer readable medium of claim 1, further comprising program code that is executable by the processor for causing the processor to cause the software operation to be executed using the classical service by transmitting one or more commands to the classical computing system, the one or more commands being configured for initiating execution of the software operation using the classical service.

13. A method comprising:

detecting, by a processor and after a software operation has been scheduled to be executed by a quantum service of a quantum computing system, an event associated with the quantum computing system; and based on detecting the event:

identifying, by the processor, a classical service of a classical computing system corresponding to the quantum service; and based on identifying the classical service, causing, by the processor, the software operation to be executed using the classical service.

14. The method of claim 13, further comprising, prior to detecting the event:

determining an association between the quantum service and the classical service using a predefined mapping of quantum services to classical services; and based on determining the association, causing the classical service to be deployed on the classical computing system.

15. The method of claim 13, wherein the classical service is a simulated quantum service that is executable within a quantum simulator on the classical computing system, the quantum simulator being configured to mimic the quantum computing system, and the simulated quantum service being configured to mimic the quantum service.

16. The method of claim 13, further comprising, prior to detecting the event:

accessing a code file to retrieve content therein, wherein the content includes a plurality of code blocks defining a software program for execution using the quantum computing system;

analyzing the content of the code file to determine a plurality of quantum services associated with the plurality of code blocks;

based on determining the plurality of quantum services, determining a plurality of classical services associated with the plurality of quantum services using a predefined mapping of quantum services to classical services; and based on determining the plurality of classical services, causing the plurality of classical services to be deployed on the classical computing system.

17. The method of claim 16, further comprising:

based on determining the plurality of classical services, incorporating a plurality of annotations into the content of the code file, each annotation of the plurality of annotations being incorporated into the code file in relation to a respective code block of the plurality of code blocks and indicating a respective classical service associated with a respective quantum service corresponding to the respective code block.

18. The method of claim 17, further comprising, in response to detecting the event:
   determining that the classical service corresponds to the quantum service based on an annotation of the plurality of annotations in the code file; and
   based on determining that the classical service corresponds to the quantum service, selecting the classical service from among the plurality of classical services for use in executing the software operation.

19. The method of claim 13, further comprising:
   in response to detecting the event, prevent the quantum service from executing, or continuing to execute, the software operation.

20. A system comprising:
   a processor; and
   a memory including instructions that are executable by the processor for causing the processor to:
      detect, after a software operation has been scheduled to be executed by a quantum service of a quantum computing system, an event associated with the quantum computing system; and
      based on detecting the event:
         identify a classical service, of a classical computing system, that corresponds to the quantum service; and
         based on identifying the classical service, cause the software operation to be executed using the classical service.

* * * * *